Jan. 17, 1956  J. R. STEINLE  2,731,074
ADJUSTABLE TRACTOR SEAT
Filed March 2, 1955
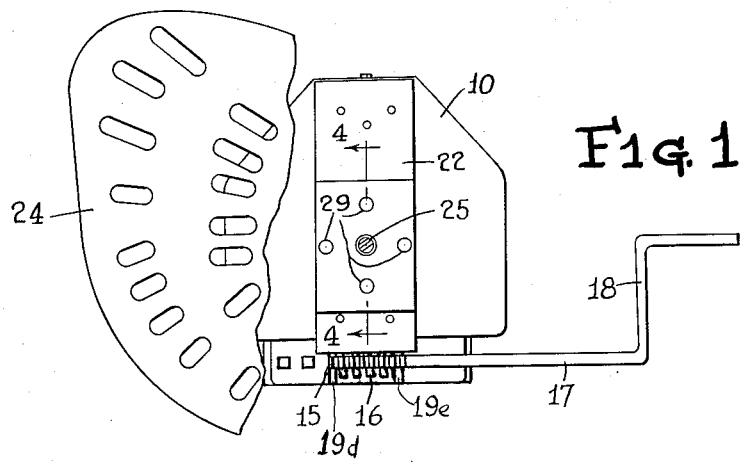
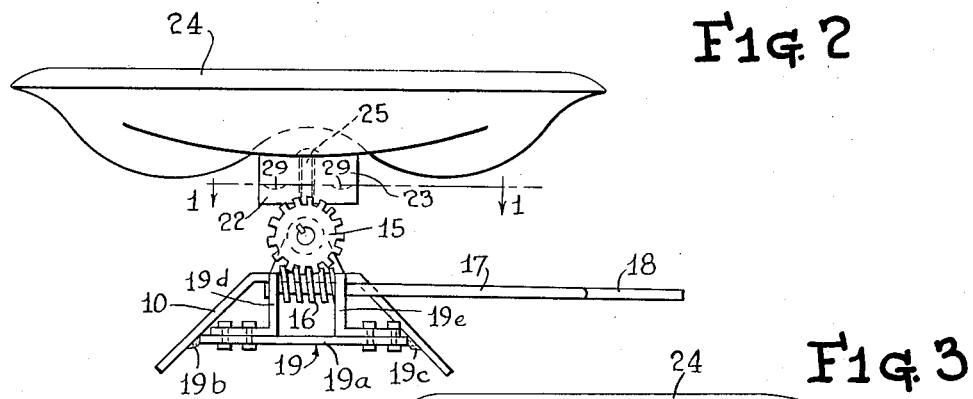
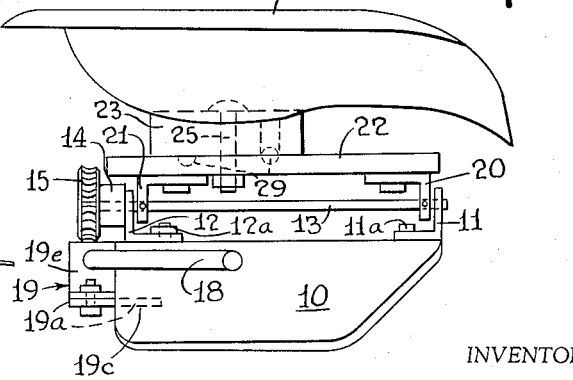
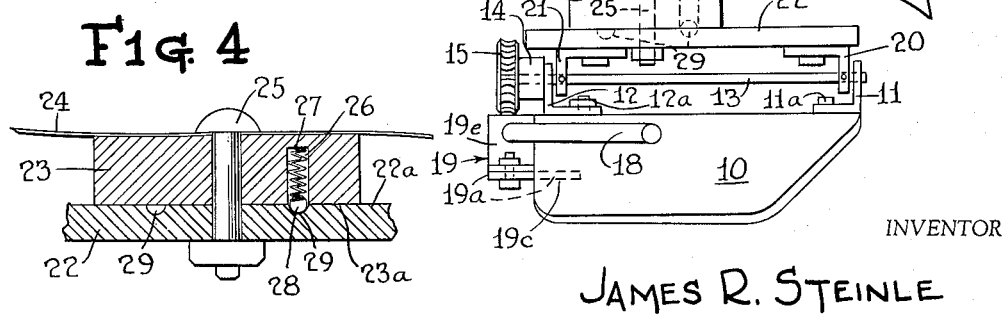
INVENTOR
JAMES R. STEINLE
BY BEALE & JONES
ATTORNEYS United States Patent Office 2,731,074
Patented Jan. 17, 1956

2,731,074

ADJUSTABLE TRACTOR SEAT

James R. Steinle, Greenville, Ohio

Application March 2, 1955, Serial No. 491,726

4 Claims. (Cl. 155—121)

This invention relates to adjustable seats and more specifically to adjusting means for seats used on tractors or other vehicles which are sometimes tilted to the side when being operated, for example when traveling along the sides of hills as in contour farming.

For such seats it is very desirable to provide adjusting means whereby the occupant of the seat may level it without moving from the seat. It is also desirable that means be provided for adjusting the seat about a vertical axis, for example to face to the side or rear, in order that the occupant may better manipulate the equipment carried by the vehicle. It is also desirable that means be provided for retaining the seat in adjusted position. Adjusting means for such seats have long been known in which the seat may be levelled about a fore and aft horizontal axis, but with no provision for adjustment about a vertical axis, one example being shown in the patent issued to Zink, No. 1,179,598. It is also old to provide an oscillating seat pivoted for free movement about a horizontal axis, this axis being mounted above a swivel for free rotation about an axis which is vertical before the vehicle is tilted, as shown by the patent to Pence et al., No. 545,529. However, neither of these types of seats is entirely satisfactory for many of the present day farming and earth-moving implements, or for tractors having special equipment installed thereon, because neither type permits the seat to be levelled on a side hill and then swung in any direction while still remaining level, nor to be retained in the selected adjusted position until a new adjustment is desired. In this connection it will be noted that in the above-mentioned patent to Pence et al. the vertical pivot tilts with the vehicle, so that if the seat is then swung sideways it too tilts.

It is an object of this invention to provide an improved level seat having mounting and adjusting means whereby the seat may be turned about a horizontal axis, for example to level it on a side hill, or turned about a vertical axis to face in any direction, or both. Another object is to provide mounting means whereby the seat may be levelled on a side hill and then turned in any direction while remaining level. Another object is to provide adjusting means whereby the seat may be adjusted by the occupant about said horizontal and vertical axes without leaving his seat. Another object is to provide convenient means for retaining such a seat in adjusted position until a new adjustment is made.

Other objects and advantages of my invention will become apparent to those skilled in the art from the following description and drawings of one embodiment of my invention.

Figure 1 is a plan view of a tractor seat made in accordance with my invention, with the seat proper partially broken away and with a supporting turntable removed to show a section along 1—1 of Figure 2;

Figure 2 is a rear elevation of the same;

Figure 3 is a side elevation of the same; and

Figure 4 is a partial section taken substantially along line 4—4 of Figure 1, shown in enlarged scale.

In the drawings, wherein like characters designate the same or similar parts, there is shown an adjustable tractor seat made in accordance with my invention comprising a horizontally disposed saddle-shaped base member 10 having bearing members 11 and 12 fixed to the top thereof adjacent the front and rear respectively, as by bolts 11a and 12a. Said bearing members extend upwardly and rotatably support a horizontal shaft 13 which extends to the rear, or left as viewed in Figure 3, beyond bearing member 12. Fixed to the extension of shaft 13 are a spacer 14 and a worm wheel 15.

Base member 10 may be mounted on a tractor or the like by means not shown with shaft 13 horizontally disposed, bearing member 11 to the front and bearing member 12 to the rear.

Meshing with worm wheel 15 is a worm 16 fixed to the shaft 17 of a crank 18. Crank shaft 17 is mounted for rotation in a bearing bracket 19 comprising a plate 19a secured as by welding at 19b and 19c to base member 10, and a pair of upstanding bearing members 19d and 19e secured as by bolts to plate 19a.

Above shaft 13, and rigidly fixed thereto by brackets 20 and 21 is a tilting plate 22.

Rotatably mounted on the upper surface of plate 22 is a turntable 23 to the top of which is secured by means not shown a seat 24. A pivot bolt 25 extends vertically through seat 25, turntable 23, and tilting plate 22, and turntable 23 with attached seat 24 is rotatable thereabout. Detent means is provided between tilting plate 22 and turntable 23 for yieldingly retaining turntable 23 in any one of a plurality of selected rotated positions, comprising a recess 26 in the lower or bearing surface 23a of turntable 23, a spring 27 housed in said recess, a ball 28 biased by said spring against the bearing surface 22a of tilting plate 22, and suitable recesses 29 in surface 22a which are in respective positions to receive ball 28 when turntable 23 is turned to one of said selected rotated positions.

In operation, when the vehicle in which the adjustable seat is mounted is tilted sideways, the seat may be levelled by turning crank 18. It is securely held in the cranked position by the worm and worm wheel. This brings pivot bolt 25 to a substantially vertical position so that then the seat may be swung right or left in a substantially horizontal plane, and yieldingly held by detent means 27—28—29 in any of a plurality of rotated positions. Both the tilt adjustment about shaft 13 and the rotational adjustment about pivot bolt 25 may be made by the occupant without leaving his seat, since crank 18 is within reach, and he may swing the seat around pivot bolt 25 by pushing with his feet against the structure of the vehicle; yet the seat is held securely in adjusted position.

Although only one embodiment of my invention has been described and shown in the drawings, it is intended to be illustrative and not to restrict the claims. Numerous variations within the scope of the invention as defined by the appended claims will be apparent to those skilled in the art.

I claim:

1. An adjustable seat comprising a base member, a horizontal shaft mounted for rotation on said base member, a worm wheel fixed to said shaft, a worm meshed with said worm wheel, said worm being mounted for rotation on said base member, means for rotating said worm to rotate said worm wheel and said shaft, a tiltable plate fixed to said shaft for rotation therewith, a turntable mounted on said plate, a vertical pivot extending through said turntable and said tiltable plate, said turntable being rotatable about said pivot, detent means engaging said tiltable plate and said turntable for yieldingly retaining said turntable in a selected rotated position on said plate, and a seat fixed to said turntable; whereby said seat may be adjusted in tilt about the axis of said horizontal shaft, rotated about said pivot, and yieldingly retained in a selected rotated position.

2. An adjustable seat comprising a base member, a horizontal shaft mounted for rotation on said base member, a worm wheel fixed to said shaft, a worm meshed with said worm wheel, said worm being mounted for rotation on said base member, means for rotating said worm to rotate said worm wheel and said shaft, a tiltable plate fixed to said shaft for rotation therewith whereby said plate may be adjusted for tilt about the axis of said shaft, a turntable mounted on said plate, the lower surface of said turntable and the upper surface of said plate having contacting bearing surfaces, a vertical pivot extending through said turntable and said tiltable plate, said turntable being rotatable about said pivot whereby said turntable may be rotatably adjusted on said plate, detent means between said bearing surfaces for yieldingly retaining said turntable in a selected rotated position on said plate, and a seat fixed to said turntable; whereby said seat may be adjusted in tilt about the axis of said horizontal shaft, rotated about said pivot, and yieldingly retained in a selected rotated position on said tilting plate.

3. An adjustable seat in accordance with claim 2 wherein said detent means comprises a recess in one of said bearing surfaces, said recess containing a spring, a ball biased by said spring against the other of said bearing surfaces, and a recess in said other of said bearing surfaces engaged by said ball in a selected rotated position of said turntable for yieldingly retaining said turntable in said selected rotated position.

4. An adjustable seat for mounting in a vehicle comprising a base member, a pair of bearing members extending upwardly therefrom adjacent the front and rear thereof respectively, a horizontal shaft mounted for rotation in said bearing members, a worm wheel fixed to the rear end of said shaft, a bearing bracket fixed to the rear of said base member below said shaft, a worm rotatably mounted in said bearing bracket, said worm being meshed with said worm wheel, a hand crank for rotating said worm, a tiltable plate fixed to said shaft, a turntable mounted on said plate, the lower surface of said turntable and the upper surface of said plate having contacting bearing surfaces, a vertical pivot bolt extending through said turntable and said tiltable plate, said turntable being rotatable about said pivot bolt, detent means between said bearing surfaces comprising a recess in said turntable, a spring in said recess, a ball biased by said spring against said tiltable plate and a plurality of recesses in said tiltable plate engaged successively by said ball in selected rotated positions of said turntable for yieldingly retaining said turntable in any of said selected rotated positions, and a seat fixed to said turntable; whereby said seat may be adjusted in tilt about the axis of said horizontal shaft, and yieldingly retained in a selected rotated position on said tiltable plate.

References Cited in the file of this patent

UNITED STATES PATENTS

| | | |
|---|---|---|
| 224,905 | Hedges et al. | Feb. 24, 1880 |
| 547,067 | Fuhrman | Oct. 1, 1895 |
| 1,375,225 | Marshall | Apr. 19, 1921 |
| 1,640,812 | Ammon | Aug. 30, 1927 |